US008595011B2

(12) United States Patent
Shi et al.

(10) Patent No.: US 8,595,011 B2
(45) **Date of Patent: *Nov. 26, 2013**

(54) CONVERTING TEXT-TO-SPEECH AND ADJUSTING CORPUS

(75) Inventors: Qin Shi, Beijing (CN); Wei Zhang, Beijing (CN); Wei Bin Zhu, Beijing (CN); Hai Xin Chai, Beijing (CN)

(73) Assignee: Nuance Communications, Inc., Burlington, MA (US)

( * ) Notice: Subject to any disclaimer, the term of this patent is extended or adjusted under 35 U.S.C. 154(b) by 1037 days.

This patent is subject to a terminal disclaimer.

(21) Appl. No.: 12/167,707

(22) Filed: Jul. 3, 2008

(65) Prior Publication Data

US 2008/0270139 A1 Oct. 30, 2008

Related U.S. Application Data

(63) Continuation of application No. 11/140,190, filed on May 27, 2005, now Pat. No. 7,617,105.

(30) Foreign Application Priority Data

May 31, 2004 (CN) .......................... 2004 1 0046117

(51) Int. Cl.
*G10L 17/00* (2013.01)

(52) U.S. Cl.
USPC .......................................................... 704/260

(58) Field of Classification Search
USPC .......................................................... 704/260
See application file for complete search history.

(56) References Cited

U.S. PATENT DOCUMENTS

| | | | | |
|---|---|---|---|---|
| 4,696,042 | A * | 9/1987 | Goudie | 704/254 |
| 4,797,930 | A * | 1/1989 | Goudie | 704/268 |
| 5,940,795 | A * | 8/1999 | Matsumoto | 704/258 |
| 6,516,298 | B1 * | 2/2003 | Kamai et al. | 704/260 |
| 6,665,641 | B1 * | 12/2003 | Coorman et al. | 704/260 |
| 7,647,226 | B2 * | 1/2010 | Sato | 704/260 |
| 8,145,491 | B2 * | 3/2012 | Hamza et al. | 704/268 |
| 2003/0093273 | A1 * | 5/2003 | Koyanagi | 704/237 |
| 2004/0024600 | A1 * | 2/2004 | Hamza et al. | 704/268 |
| 2004/0093213 | A1 * | 5/2004 | Conkie | 704/258 |
| 2012/0239176 | A1 * | 9/2012 | Lien | 700/94 |

* cited by examiner

*Primary Examiner* — Michael N Opsasnick
(74) *Attorney, Agent, or Firm* — Wolf, Greenfield & Sacks, P.C.

(57) ABSTRACT

The present invention provides a method and apparatus for text to speech conversion, and a method and apparatus for adjusting a corpus. The method for text to speech comprises: text analysis step for parsing the text to obtain descriptive prosody annotations of the text based on a TTS model generated from a first corpus; prosody parameter prediction step for predicting the prosody parameter of the text according to the result of text analysis step; speech synthesis step for synthesizing speech of said text based on said the prosody parameter of the text; wherein descriptive prosody annotations of the text include prosody structure for the text, the prosody structure of the text is adjusted according to a target speech speed for the synthesized speech. The present invention adjusts the prosody structure of the text according to the target speech speed. The synthesized speech will have improved quality.

34 Claims, 6 Drawing Sheets

CONVERTING TEXT-TO-SPEECH AND ADJUSTING CORPUS

CROSS-REFERENCE TO RELATED APPLICATIONS

This application is a continuation of U.S. application Ser. No. 11/140,190, entitled "CONVERTING TEXT-TO-SPEECH AND ADJUSTING CORPUS," filed on May 27, 2005, now U.S. Pat. No. 7,617,105, which is herein incorporated by reference in its entirety. Foreign priority benefits are claimed under 35 U.S.C. §119(a)-(d) or 35 U.S.C. §365(b) of Chinese application number 200410046117, filed May 31, 2004.

FIELD OF THE INVENTION

The present invention relates to Text-To-Speech (TTS) conversion technology. More particularly, the present invention relates to speech speed adjustment and corpus adjustment in Text-To-Speech conversion technology.

BACKGROUND OF THE INVENTION

The ideal of the TTS system and method is to convert the input text to the synthesized speech as natural as possible. The natural speech character hereinafter is refer to the speech character with natural voice as the voice of human being. The natural voice is usually archived by recording the real human being voice of read aloud text. TTS technology, especially TTS for natural speech, usually uses a speech corpus which comprises a huge amount of text with corresponding recorded speech, prosody label and other basic information label. In general, a TTS system and method includes three components: text analysis, prosody parameter prediction and speech synthesis. For a plain text to be converted to speech based on the corpus, text analysis is responsible for parsing the plain text to be rich text with descriptive prosody annotations such as prosody structure information including phrase boundaries and pauses, pronunciation, and accent annotation of the text. Prosody parameter prediction is responsible for predicting the phonetic representation of prosody, i.e. prosody parameters, such as values of pitch, duration and energy according to the result of text analysis. Speech synthesis is responsible for generating speech of the text based on the prosody parameters. Based on a nature speech corpus, the speech is intelligible voice as a physical result of the representation of semantics and prosody information implicitly in the plain text.

Statistics based approaches are an important tendency in current TTS technologies. In these kinds of approaches, text analysis and prosody parameter prediction models are trained with a large labeled corpus, and speech synthesis is always based on selection from multiply candidates for each synthesis segment to obtain required synthesized speech.

Nowadays, prosody structure of the text as an important component in test analysis is always regarded as the result of semantics and syntax analysis of the text. Prior art technologies on prosody structure prediction hardly realize and consider the influence from speed adjustment. However, comparison between two different speech speed corpuses shows that the relationship between speed and prosody structure is significant.

Moreover, when different speech speed is required for TTS, prior art will adjust the duration of the prosody parameter in the speech synthesis phase to meet the speech speed requirement. This measure will degrade the quality of the synthesized speech due to not having considered the relationship between the speech speed and the prosody structure.

SUMMARY OF THE INVENTION

In view of the above discussion, the present invention provides an improved apparatus and method for text to speech conversion to achieve improved speech quality. An aspect of the present invention is to provide an apparatus and method for adjusting the TTS corpus to meet the need of a target speech speed.

According to the aspect of the present invention, a method is provided for text to speech (TTS) conversion, comprising: text analysis step for parsing the text to obtain descriptive prosody annotations of the text based on a TTS model generated from a first corpus; prosody parameter prediction step for predicting the prosody parameter of the text according to the result of text analysis step; speech synthesis step for synthesizing speech of said text based on said the prosody parameter of the text; wherein descriptive prosody annotations of the text include prosody structure for the text, the prosody structure of the text is adjusted according to a target speech speed for the synthesized speech.

According to a further aspect of the present invention, an apparatus for text to speech (TTS) conversion is provided, the apparatus comprising: text analysis means for parsing the text to obtain descriptive prosody annotations of the text based on a TTS model generated from a first corpus, said descriptive prosody annotations of the text including prosody structure of the text; prosody parameter prediction means for predicting the prosody parameter of the text according to the result of text analysis step; speech synthesis means for synthesizing speech of said text based on said the prosody parameter of the text; wherein said apparatus further comprising prosody structure adjusting means for adjusting the prosody structure of the text according to a target speech speed for the synthesized speech.

According to another aspect of the invention, the target speech speed corresponds to a second speech speed of a second corpus.

According to a further aspect of the present invention, a method for adjusting a TTS corpus is provided.

According to a further aspect of the present invention, an apparatus for adjusting a TTS corpus is provided.

BRIEF DESCRIPTION OF THE FIGURES

The features, advantages and objectives of the present invention will be better understood from the following description of the preferable embodiments with reference to accompany drawings, in which.

DETAILED DESCRIPTION OF THE INVENTION

Figure 1:
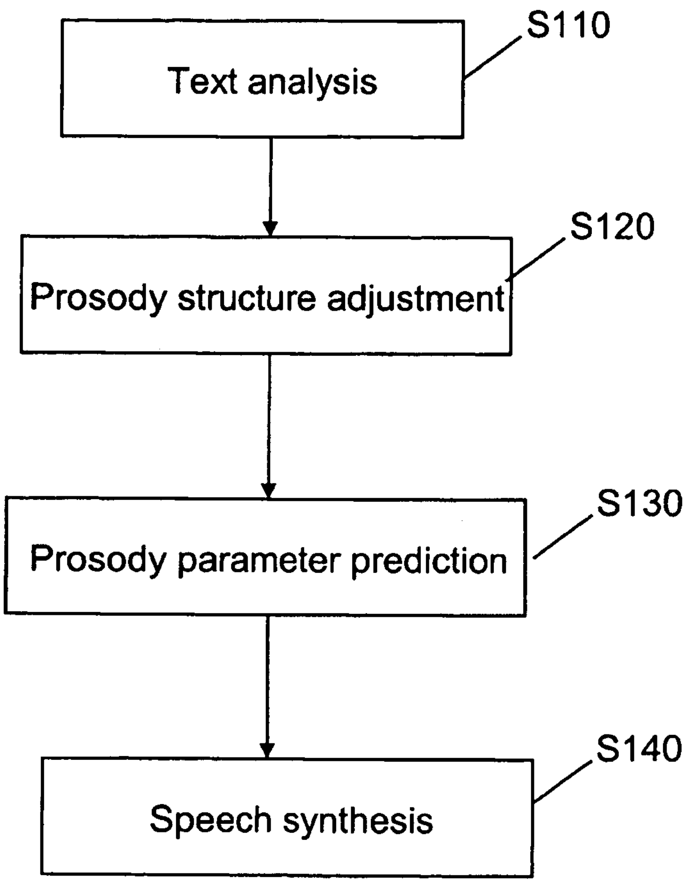
FIG. 1 is a schematic flowchart for a text to speech conversion method according to one aspect of the present invention.

The present invention provides apparatus and methods for adjusting the TTS corpus to meet the need of a target speech speed. In an example embodiment, a method is provided for text to speech (TTS) conversion, comprising: text analysis step for parsing the text to obtain descriptive prosody annotations of the text based on a TTS model generated from a first corpus; prosody parameter prediction step for predicting the prosody parameter of the text according to the result of text analysis step; speech synthesis step for synthesizing speech of said text based on said the prosody parameter of the text; wherein descriptive prosody annotations of the text include prosody structure for the text, the prosody structure of the text is adjusted according to a target speech speed for the synthesized speech.

The present invention provides an apparatus for text to speech (TTS) conversion. An apparatus comprising: text analysis means for parsing the text to obtain descriptive prosody annotations of the text based on a TTS model generated from a first corpus, said descriptive prosody annotations of the text including prosody structure of the text; prosody parameter prediction means for predicting the prosody parameter of the text according to the result of text analysis step; speech synthesis means for synthesizing speech of said text based on said the prosody parameter of the text; wherein said apparatus further comprising prosody structure adjusting means for adjusting the prosody structure of the text according to a target speech speed for the synthesized speech.

According to an aspect of the invention, the target speech speed corresponds to a second speech speed of a second corpus. The prosody structure includes prosody phrase, said prosody structure of the text is adjusted by adjusting the distribution of the prosody phrase length of the text to match the distribution of the second corpus. Thereby, the distribution of the prosody phrase length of the text is suitable for the target speech speed.

The present invention also provides a method for adjusting a TTS corpus is provided, said corpus is a first corpus. The method comprising: building a decision tree for prosody prediction based on the first corpus; setting a target speech speed for the corpus; building the relationship between the distribution for prosody phrase length and the speech speed for the first corpus based on said decision tree; adjusting said distribution for prosody phrase length of the first corpus according to the target speech speed based on said decision tree and said relationship.

The present invention also provides an apparatus for adjusting a TTS corpus is provided. The corpus is a first corpus. The apparatus comprising: means for building a decision tree for prosody prediction based on the first corpus; means for setting a target speech speed for the corpus; means for building the relationship between the distribution for prosody phrase length and the speech speed for the first corpus based on said decision tree; means for adjusting said distribution of prosody phrase length of the first corpus according to the target speech speed based on said decision tree and said relationship.

As described at the beginning of this application, the ideal of the TTS apparatus and method is to convert the input text to the synthesized speech as natural as possible. The present invention provides an improved technology to meet the ideal of the TTS. The present invention provides a method and apparatus to establish the relationship between speech speed and prosody structure of utterance and gives out a solution to adjust prosody structure of the text according to the speech speed requirement.

The present invention in providing methods and apparatus for speech speed dependent prosody structure prediction of the text, will now be described in more detail by referring to the drawings that accompany the present application. As described above, prior art technologies on prosody structure prediction hardly realize and consider the influence from speed adjustment. However, comparison between different speech speed corpuses shows that the relationship between speed and prosody structure is significant. Prosody structure includes prosody word, prosody phrase and intonation phrase. While the speech speed is faster, the prosody phrase length would be longer□and the intonation phrase length might also be longer. If one model for text analysis, which is generated from one corpus with a first speech speed, predicts the prosody structure of the input text, the result will not match the prosody structure extracted from another corpus, which recorded in different speech speed. Based on the above analysis, the prosody structure of the text could be adjusted according to a desired speech speed to achieve better quality for text to speech conversion. For the same purpose, the distribution of the intonation phrase length of the text could also be adjusted individually or in combination with the above method. According to the present invention, the method for adjusting the distribution of the intonation phrase length of the text is same or similar to the method for adjusting the distribution of the prosody phrase length of the text.

Adjusting the prosody structure of the text is preferred to be done by adjusting the distribution of the prosody phrase length to a target distribution. The target distribution can be achieved through different ways. For example, the target distribution may correspond to the distribution of the prosody phrase length of another corpus; the target distribution can be obtained through analyzing recorded human reading voices: the target distribution can be obtained by weight averaging the distribution of the prosody phrase length of several corpuses or subject audio evaluating the adjusted distribution.

Figure 2:
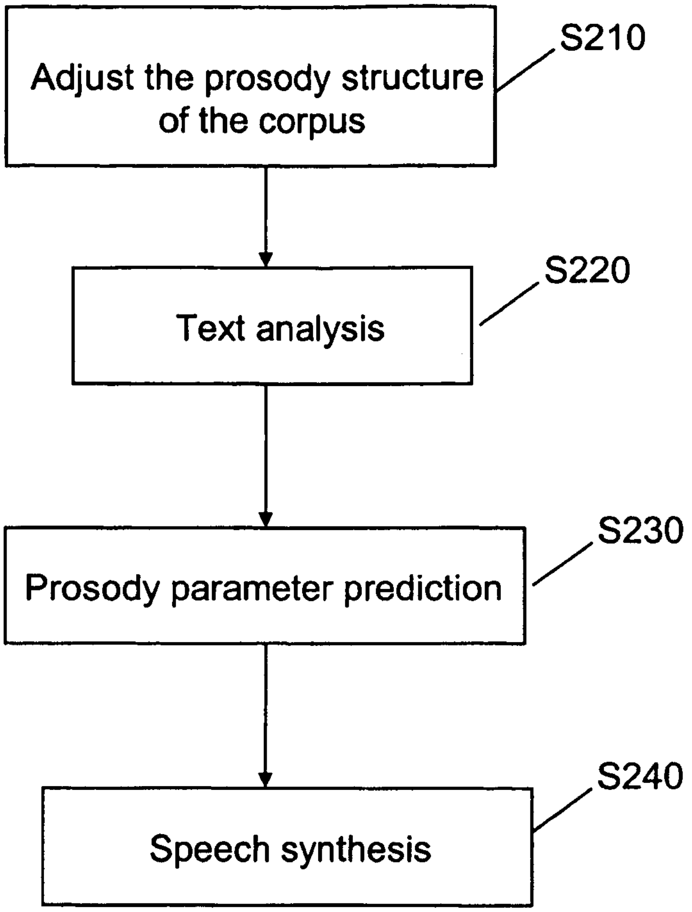
FIG. 2 is a schematic flowchart for another text to speech conversion method according to the present invention.

Adjusting the prosody structure of the text based on the required speech speed can be carried out through many ways. The prosody structure of the text can be adjusted together with or after the text analysis step as shown in FIG. 1. As an alternative, the prosody structure of the corpus can be adjusted before the analyzing the input text, thereby the result of analyzing the input text is adjusted, as shown in FIG. 2. Adjusting the prosody structure can also be carried out by modifying the statistics model or grammatical rules and semantic rules for the text prosody analysis according to the speech speed. Other rules for the text prosody analysis can also be modified to adjust the prosody structure. For example, set rules to combine parts of prosody phrases to increase the length of prosody phrases for faster speech speed. Such combination comprises combining grammatical equivalents or related sentence element. Adjusting the prosody structure is preferred to be done by adjusting the threshold for prosody boundary probability shown in the following embodiment.

FIG. 1 is a schematic flowchart for a text to speech conversion method according to one aspect of the present invention. In FIG. 1, at text analysis step S110, the text to be converted to speech, will be parsed to obtain descriptive prosody annotations of the text based on a text to speech model generated from a first corpus. The text to speech model comprises text to prosody structure prediction model and prosody parameter prediction model.

The corpus comprises recorded audio files for huge amount of text, and the corresponding prosody labels including prosody structure labels and other basic information labels, etc. The text to speech model stores the text to speech conversion rules based on the first corpus. Wherein, the descriptive prosody annotations comprise the prosody structure, pronunciation and accent annotation, etc. The prosody structure comprises prosody word, prosody phrase and intonation phrase. Then, at the adjusting prosody structure step S120, the prosody structure of the text is adjusted according to a target speech speed.

The speech speed of the corpus might also be considered when adjusting the prosody structure. A person skilled in the art can understand that the adjusting prosody structure step S120 can be carried out together with or after the text analysis step S110. At the prosody parameter prediction step S130, the prosody parameters of the text are predicted according to the result of text analysis step and the prosody parameter prediction model of the text to speech model.

The prosody parameters of the text comprise the value of pitch, duration and energy, etc. At the speech synthesis step S140, the speech for the text are generated based on the prosody parameter of the text and the corpus. In the speech synthesis step S140, the predicted prosody parameter, e.g. the duration, might also be adjust of to meet the speech speed requirement. It could be understood that the predicted prosody parameter could also be adjusted before the speech synthesis step. A person skilled in the art can understand that the above method can further comprises an audio evaluation step (not shown in the figure), and the prosody structure of the text can be further adjusted according to the audio evaluation result.

FIG. 2 is a schematic flowchart for another text to speech conversion method according to the present invention. In FIG. 2, first at step S210 for adjusting prosody structure of the corpus, prosody structure of the corpus to be used for text to speech conversion is adjusted according to a target speech speed. The original speech speed of the corpus might also be considered when adjusting the prosody structure. Then, at text analysis step S220, the text to be converted to speech will be parsed to obtain descriptive prosody annotations of the text based on the text to speech model generated from the adjusted corpus. The descriptive prosody annotations of the text include prosody structure for the text. At the prosody parameter prediction step S230, the prosody parameters of the text are predicted according to the result of text analysis step and the text to speech model. At the speech synthesis step S240, the speech for the text is generated based on the prosody parameter of the text. In the speech synthesis step S240, the predicted prosody parameter, e.g. the duration, might also be adjust of to meet the speech speed requirement. Comparing with the method of FIG. 1, the method illustrated in FIG. 2 is preferred but not limited to convert large amount of text to speech according to the target speech speed.

Compared to the method of FIG. 2, the method illustrated in FIG. 1 is advantageous but is not limited to process small amount of text to be converted to speech according to the target speech speed. In the methods of FIGS. 1 and 2, the prosody structure is preferred to be adjusted by adjusting the distribution of the prosody phrases length. The distribution of the prosody phrases length is preferred to be adjusted to a target distribution, and in particular to match the target distribution. The target distribution may correspond to the prosody phrases distribution of a second corpus. In the method of FIG. 2, the first corpus has a first distribution for prosody phrase length corresponding to a first threshold for prosody boundary probability under a first speech speed; the second corpus has a second distribution for prosody phrase length corresponding to a second threshold for prosody boundary probability under a second speech speed. The prosody structure is adjusted by the following step: adjusting the first threshold for prosody boundary probability to make the distribution for prosody phrase length of the first corpus matches that of the second corpus. Text analysis step is carried out by parsing the text according to the adjusted first corpus. While for the method of FIG. 1, similar process can be adopted to make the prosody structure of the text to match a target distribution, e.g. the distribution of the second corpus.

Figure 3:
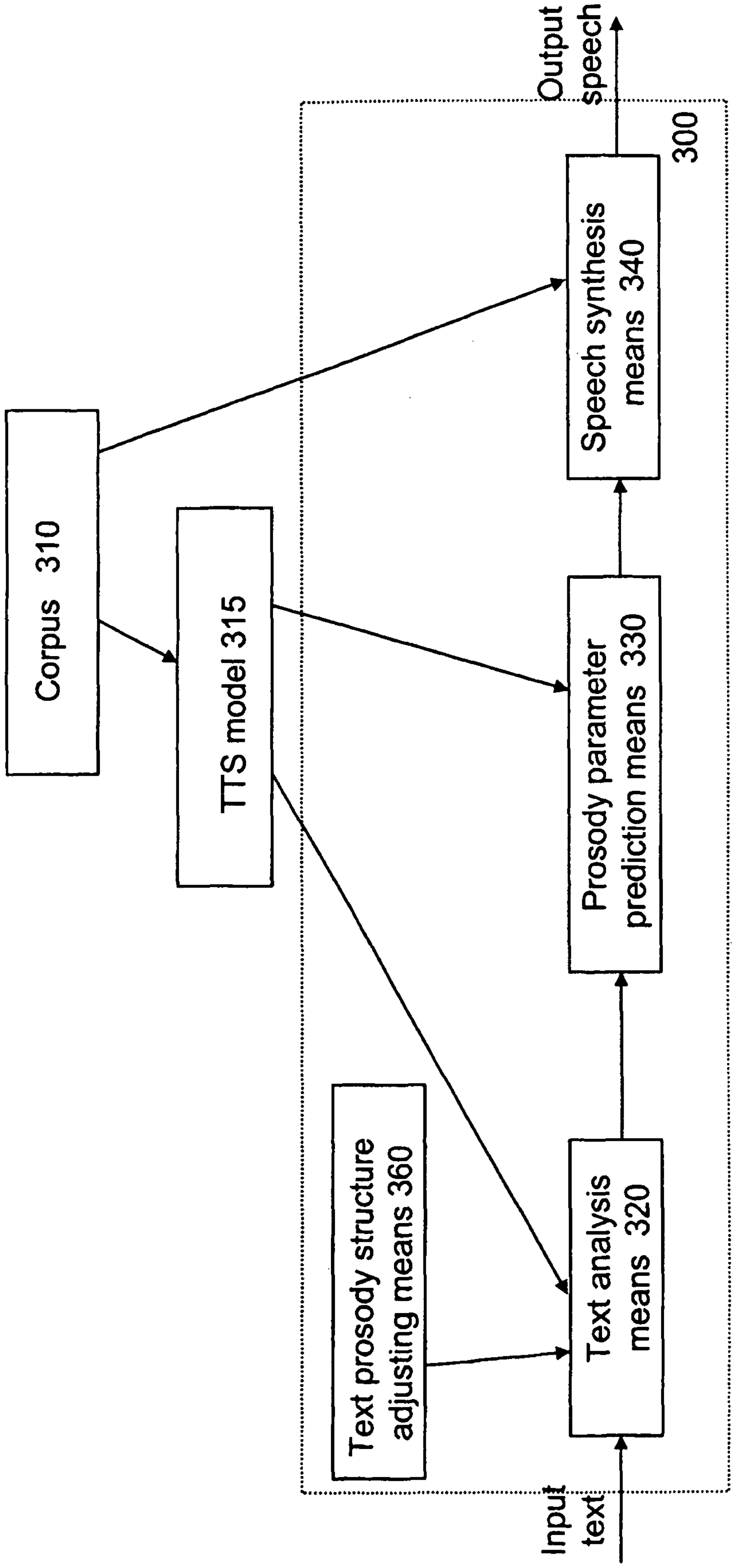
FIG. 3 is a schematic view for the text to speech apparatus according to another aspect of the present invention.

FIG. 3 is a schematic view for the text to speech apparatus according to another aspect of the present invention. The apparatus is suitable, but not limited, to process the method of FIG. 1. In FIG. 3, the text to speech apparatus 300 comprises a text prosody structure adjusting means 360, a text analysis means 320, a prosody parameter prediction means 330 and a speech synthesis means 340. The text to speech apparatus 300 might invoke different corpus (e.g. the first corpus 310 in FIG. 3) and TTS model 315 as required. TTS model 315 is generated from the corpus 310. The corpus 310 comprises the wav documents for huge amount of texts, the prosody label of the texts and basic information label, etc. The TTS model 315 comprises the rules for text to speech conversion. The text to speech apparatus 300 might also comprises a corpus 310 and a TTS model 315 used for text to speech conversion as required. However, it is not a must for the text to speech apparatus 300 to include a corpus and a TTS model.

In FIG. 3, the text analysis means 320 is responsible for parsing the input text to obtain descriptive prosody annotations of the text based on the TTS model generated from the corpus 310. The descriptive prosody annotations of the text comprise the prosody structure of the text. The TTS model 315 comprises text to prosody structure prediction model and prosody parameter prediction model. The prosody parameter prediction means 330 receives the analysis result from the text analysis means 320, and predicts the prosody parameters for the text based on information received from the text analysis means and TTS model 315. The speech synthesis means 340 couples to the prosody parameter prediction means, receives the predicted prosody parameters of the input text, and synthesizes speech for the text based on the predicted prosody parameters and the corpus 310. The prosody structure adjusting means 360 couples to the text analysis means 320, and adjusts the prosody structure of the text according to the target synthesized speech speed. The speech speed of the corpus 310 might be considered when adjusting the prosody structure. The speech synthesis means 340 might also adjust the predicted prosody parameter, e.g. the duration, to meet the target speech speed requirement.

Figure 4:
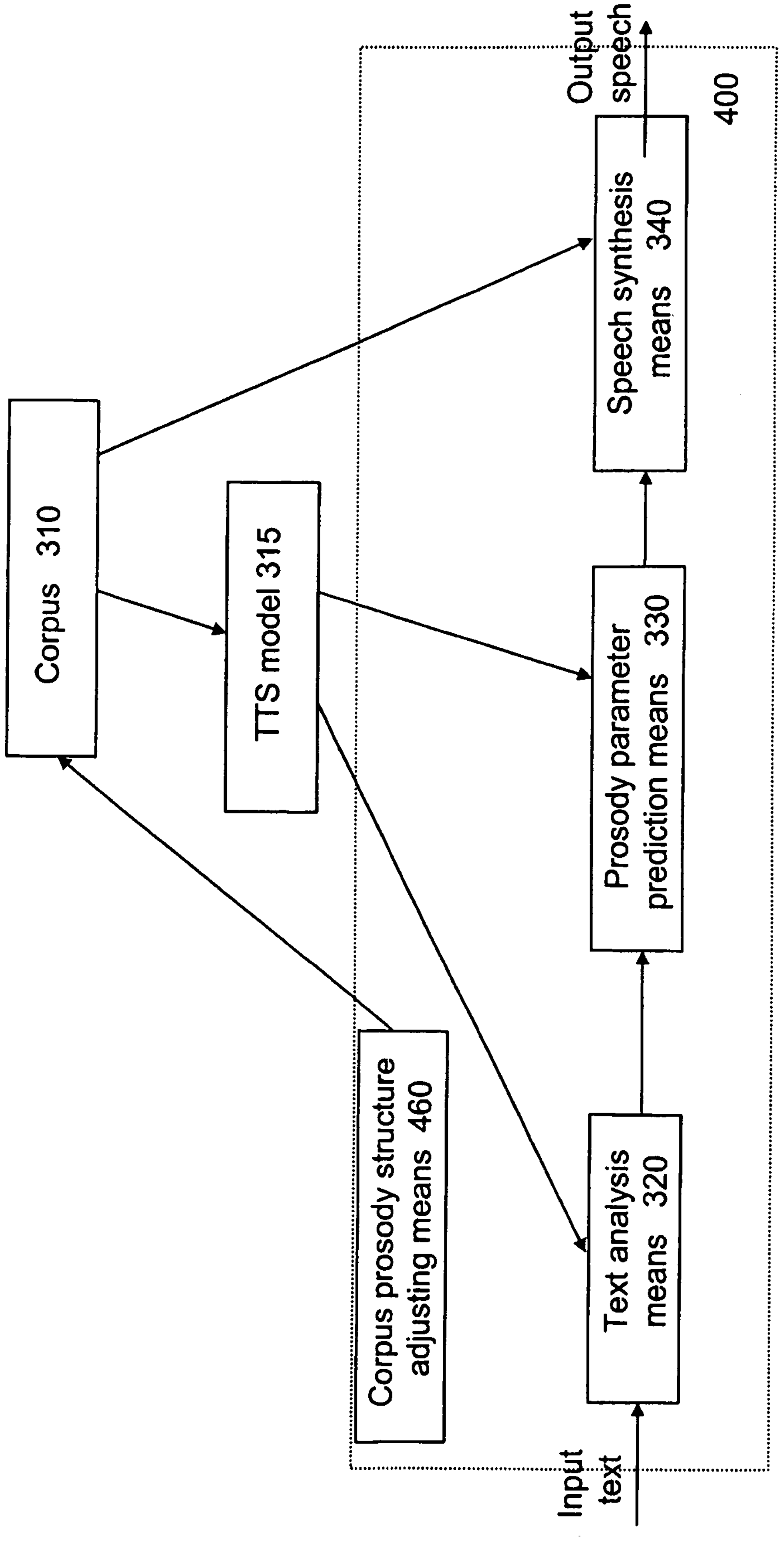
FIG. 4 is a schematic view for another text to speech apparatus according to the present invention.

FIG. 4 is a schematic view for another embodiment of text to speech apparatus according to the present invention. The apparatus is suitable, but not limited, to process the method of FIG. 2. In FIG. 4, the text to speech apparatus 400 comprises a corpus prosody structure adjusting means 460, a text analysis means 320, a prosody parameter prediction means 330 and a speech synthesis means 340. The text to speech apparatus 400 might invoke different corpus, e.g. the corpus 310 in the figure, and TTS model 315 generated from the corpus. The text to speech apparatus 400 might comprise a corpus 310 and a TTS model 315, as described above with reference to FIG. 3, used for text to speech conversion as required. However, it is not a must for the text to speech apparatus 400 to include a corpus. The corpus prosody structure adjusting means 460 is configured to adjust the prosody structure of the corpus 310 according to a target speech speed. The original speech speed of the corpus 310 might also be considered when adjusting the prosody structure. The text analysis means 320 is responsible for parsing the input text to obtain descriptive prosody annotations of the text based on the TTS model 315 generated from the adjusted corpus 310. The text analysis means 320 output rich texts with the descriptive prosody annotations. The descriptive prosody annotations of the text including prosody structure for the input text. The prosody parameter prediction means 330 receives the analysis result from the text analysis means 320, and predicts the prosody parameters for the text based on information received from the text analysis means and TTS model. The speech synthesis means 340 couples to the prosody parameter prediction means, receives the predicted prosody parameters of the input text, and synthesizes speech for the text based on the predicted prosody parameters and the corpus 310. The speech speed of the corpus 310 might be considered when adjusting the prosody structure. The speech synthesis means 340 might also adjust the predicted prosody parameter, e.g. the duration, meet the target speech speed requirement.

Figure 5:
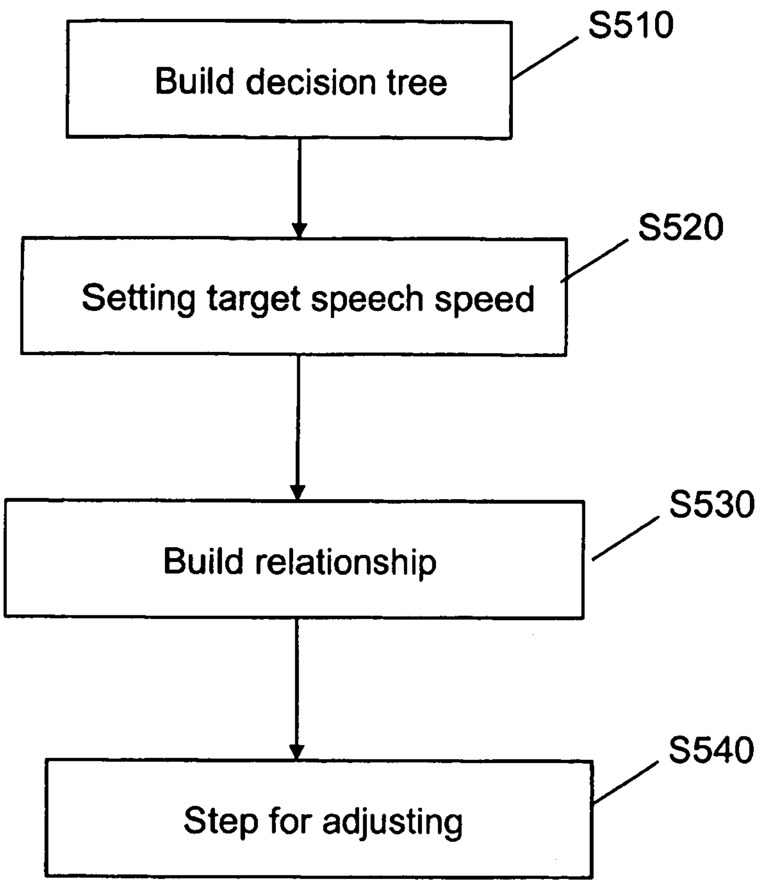
FIG. 5 is a flowchart for a preferred method for adjusting a TTS corpus according to the present invention.

FIG. 5 is a flowchart for a preferred method for adjusting a TTS corpus according to the present invention. It could be understand, the following method is also suitable for adjusting the predicted prosody structure of the input text to be converted to speech. In the method, the corpus to be adjusted has a first distribution, $\text{Distribution}_A$, for prosody phrase length corresponding to a first threshold, $\text{Threshold}_A$, for prosody boundary probability under a first speech speed, $\text{Speed}_A$. At building decision tree step S510, decision tree for prosody structure prediction for the text in the corpus is built based on the corpus. The prosody boundaries' context information for every word in the corpus is extracted. Then, the decision tree for predicting the prosody boundary is built based on the prosody boundaries' context information. The context information includes left and right words' information. The words' information comprises the POS (Part of Speech), syllable length □or word length□ and other syntactic information.

The feature vector for boundary i, F(Boundary_), for the word i could be present as following:

$$F(\text{Boundary}_i)=(F(w_{i-N}),F(w_{i-N-1}), \ldots ,F(w_i), \ldots F(w_{i+N-1}))$$

$$F(w_k)=(POS_{w_k},\text{Length}_{w_k}, \ldots )(i-N-1\le k\le i+N-1)$$

Wherein, $F(W_k)$ represents the feature vector of word k, $POS_{Wk}$ represents the part of speech information of word k, $\text{length}_{wk}$ represents the syllable length or word length of word k.

Based on the above information, Decision Tree for predicting prosody structure or boundary is built. When a new sentence comes in, after extracting the feature vectors and building the decision tree as above-mentioned, the probability of every boundary before and after the word is obtained by traversing the decision tree. As well known, Decision Tree is a statistic method, which considers the context feature of each unit and gives probability ($\text{Probability}_i$) for each unit. The threshold (Threshold=$\alpha$) is defined as: if the boundary probability is higher than $\alpha$, a boundary will be assigned.

At setting target speech speed step S520, a desired speech speed for the corpus is set as required. The desired speech speed could correspond to a special application of text to speech conversion. As a preferred embodiment, the desired speech speed might correspond to the speech speed of a second corpus. This second corpus has a second distribution, $\text{Distribution}_B$, for prosody phrase length corresponding to a second threshold, $\text{Threshold}_B$, for prosody boundary probability under a second speech speed, $\text{Speed}_B$.

At the building the relationship step S530, the relationship between the prosody structure, e.g. the distribution of prosody phrase length, and the target speech speed is built for the first corpus. In this preferred embodiment, the relationship between the distribution for prosody phrase length and the target speech speed is established via a threshold for prosody boundary probability. For a given threshold, if the speech speed is faster, then there will be more prosody phrase with longer length. As an alternative, the relationship could be built according to building and/or analysis to the corpuses with different speech speed. The relationship could also be built through the subjective audio evaluation to synthesis result regarding the prosody phrase length distribution with corresponding speech speed.

As mentioned above, different corpuses which are recorded in different speed have been investigated. It is found that the distribution of prosody phrase length between them is different. While the speech speed is faster, there will be more prosody phrase with longer length. According to the above discussion, it could be understood if the threshold is lower, the boundary number will be increased and the prosody phrase length will be shorter. On the contract, if the threshold is higher, the boundary number will be decreased and the prosody phrase length will be longer. Therefore, the distribution and the target speech speed could be related through the threshold. Tune the threshold could make the distribution of prosody phrase length of one corpus (A) matching another one. This new distribution would match speech speed of corpus. Therefore, the prosody structure according to the speed requirement could be achieved. As an alternative, the distribution of prosody phrase length of the corpus (A) can be adjusted to match that of a target distribution.

In other words, the distribution of the first corpus's prosody phrase length could be adapted to the distribution of the second corpus's prosody phrase length by adjusting or changing the threshold for prosody boundary probability (Threshold). For example, the corpus's speed ($\text{Speed}_A$) is related with prosody phrase length distribution ($\text{Distribution}_A$) under $\text{Threshold}_A=0.5$. And the information of the second corpus under $\text{Speed}_B$:$\text{Distribution}_B$ under $\text{Threshold}_B=0.5$ could be obtained based on the above decision tree. Then, the threshold for the first corpus could be changed to make the $\text{Distribution}_A$ match the $\text{Distribution}_B$ under $\text{Speed}_B$.

For the two corpuses, the relationship between speed A and speed B ($\text{Speed}_B=\alpha\cdot\text{Speed}_A$) is known. The $\text{Threshold}_A$ could be tuned to make $\text{Distribution}_A|(\text{Threshold}_A=\beta)=\text{Distribution}_B|(\text{Threshold}_B=0.5)$.

$\text{Distribution}_A|(\text{Threshold}_A=\beta)$ represent the distribution A of prosody phrase length of the first corpus under the prosody boundary probability threshold $\beta$. $\text{Distribution}_B|(\text{Threshold}_B=0.5)$ represent the distribution B of prosody phrase length of the second corpus under the prosody boundary probability threshold 0.5.

At the adjusting step S540, the distribution for prosody phrase length of the first corpus is adjusted according to the target speech speed based on the decision tree and the relationship. In this preferred embodiment, $\text{Distribution}_A|(\text{Threshold}_A=\beta)$ could be defined as: $\text{Distribution}_A|(\text{Threshold}_A=\beta)=\text{Max}(\text{Count}(\text{Length}_i))|(\text{Threshold}_A=\beta)$ $\text{Max}(\text{Count}(\text{Length}_i))|(\text{Threshold}_A=\beta)$ represent the distribution of prosody phrase with max length under threshold $\beta$, e.g. the proportion or percentage regarding the number of the prosody phrase.

In the same way, the relation with other corpus at different speech speed could be built. Other parameters linking speed and threshold could be obtained by curve fitting method.

As an alternative to the above method, the prosody phrase length distribution of the text could be adjusted by adjusting the distribution of prosody phrase with maximum length or maximum phrase number and prosody phrase with second maximum length, etc. Curve fitting method could also be employed to match the prosody phrase length distribution of the first corpus with that of the second corpus. If the boundary threshold for the first corpus is changed, a set of curves which present prosody phrase length distribution will be generated.

For the second corpus, a prosody phrase length distribution curve could be obtained. A curve under a certain threshold which is most similar with the curve of the second corpus could be found. Then the threshold which is related with the prosody structure under target speed could be obtained.

The method that calculates the difference between two curves generally could be described as the following:

Curve could be present as:

$$f(n) = \frac{\text{Count}(n)}{\sum_{m=0}^{M} \text{Count}(m)} \text{ and } (n = 1, \ldots, M),$$

Wherein, f(n) represents the proportion of prosody phrases with length n in all the prosody phrases, Count(n) represents the number of prosody phrases with length n, M is the maximum length of prosody phrase.

If we have two curves: $f_1(n)$ and $f_2(n)$, the difference between them could be defined as:

$$Diff(f_1, f_2) = \frac{\sum_{n=1}^{M} (f_1(n) - f_2(n))}{M}$$

Of course, there are also other methods that calculate the difference between two curves. For example: angle chain code method, by ZHAO Yu and CHEN Yan-Qiu, in "Included Angle Chain: A Method for Curve Representation", Journal of Software, 2004, Vol. 15 No. 2, P300-307.

A person skilled in the art can understand that the above method for adjusting the distribution of the prosody phrase length can also be used to adjust the distribution of the intonation phrase length.

Figure 6:
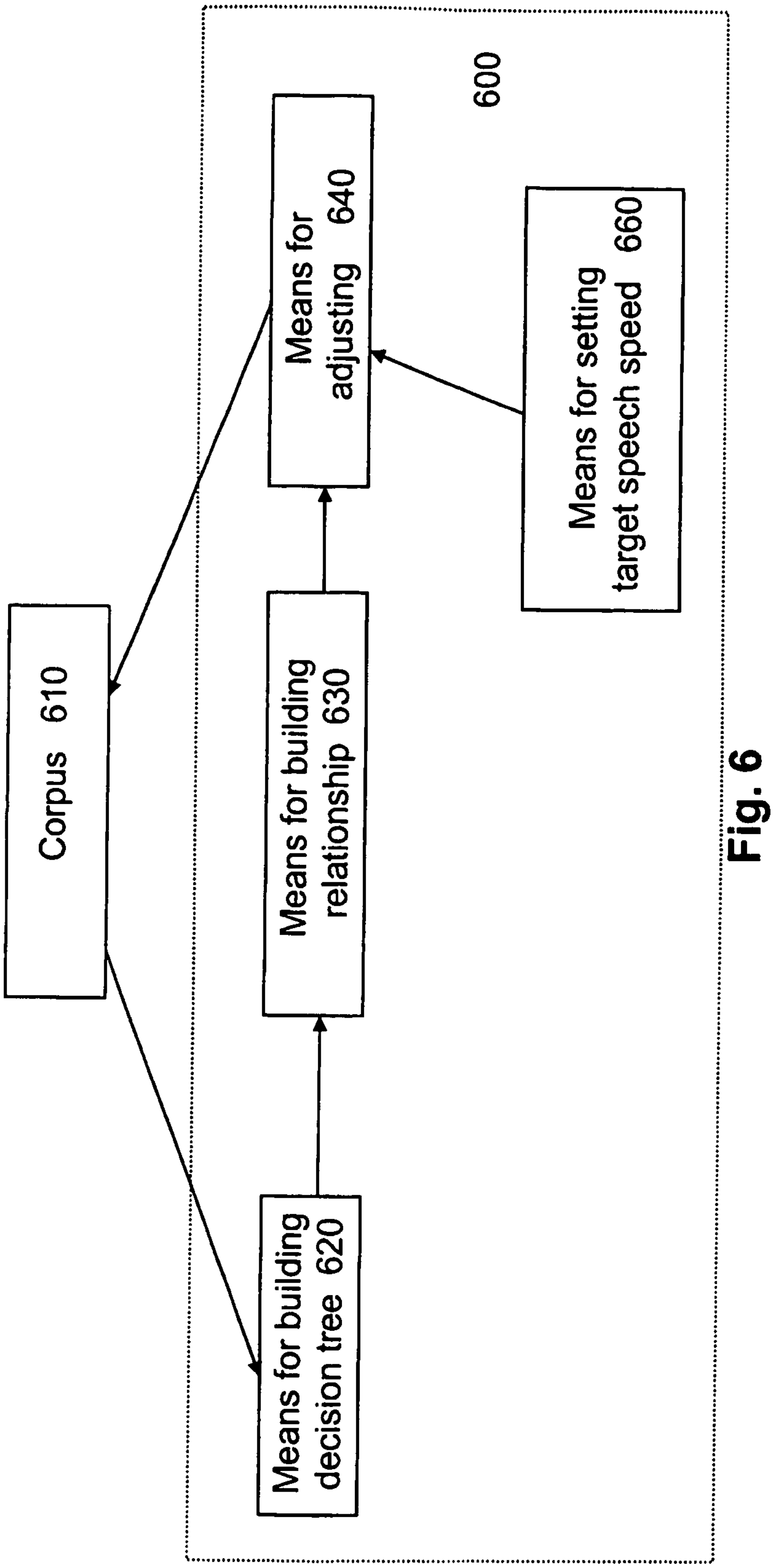
FIG. 6 is a schematic view for a preferred apparatus for adjusting a TTS corpus according to the present invention.

FIG. 6 is a schematic view for a preferred apparatus for adjusting a TTS corpus according to the present invention. The apparatus is suitable, but not limited to carry out the method of FIG. 5. In the figure, an apparatus 600 for adjusting a TTS corpus, the corpus is a first corpus, the apparatus comprises: means 620 for building a decision tree, means 660 for setting a target speech speed, means 630 for building the relationship and means 640 for adjusting. Wherein means 620 for building a decision tree is configured to build a decision tree for prosody prediction based on the first corpus; means 660 for setting a target speech speed is configured to set a target speech speed for the corpus; means 630 for building the relationship is configured to build the relationship between the distribution for prosody phrase length and the speech speed for the first corpus based on said decision tree; means 640 for adjusting is configured to adjust said distribution of prosody phrase length of the first corpus according to the target speech speed based on said decision tree and said relationship.

Wherein, the means 620 for building the decision tree is further configured to extract the prosody boundaries' context information for every word in the first corpus; and build said decision tree for prosody boundary prediction based on the prosody boundaries' context information.

Wherein, the means 640 for adjusting is further configured to adjust the distribution of the prosody phrase length of the first corpus according to said target speech speed to match a target distribution. The target speech speed might correspond to a second speech speed of a second corpus. Wherein, said first corpus has a first distribution (A) of prosody phrase length corresponding to a first threshold (A) for prosody boundary probability under a first speech speed (A), said second corpus has a second distribution of prosody phrase length corresponding to a second threshold for prosody boundary probability under a second speech speed (A), said means 640 for adjusting the distribution is further configured to adjust the distribution of the prosody phrase length of the first corpus according to the distribution of the prosody phrase length of the second corpus.

Wherein, said means 630 for building the relationship between the distribution for prosody phrase length and the speech speed further is configured to: build the relationship between the threshold for prosody boundary probability, the distribution for prosody phrase length and the speech speed for the first corpus. The means 640 for adjusting said distribution is further configured to adjust the distribution for prosody phrase length of the first corpus by adjusting the threshold for prosody boundary probability, or adjust the prosody phrase length distribution by adjusting the distribution of prosody phrase with maximum length or maximum phrase number.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A method for text to speech conversion, comprising:

parsing, with at least one processor, input text to obtain descriptive prosody annotations of the text based, at least in part, on a text-to-speech model generated from a first corpus, wherein the descriptive prosody annotations include a prosody structure of the text, wherein the prosody structure of the text is associated with an initial speech speed, and wherein said prosody structure includes information selected from the group consisting of prosody word information, prosody phrase information, and intonation phrase information;

adjusting the prosody structure of the text based, at least in part, on a target speech speed for speech to be synthesized corresponding to the input text, wherein the target speech speed is different than the initial speech speed;

determining at least one prosody parameter of the text based, at least in part, on the adjusted prosody structure of the text; and synthesizing speech corresponding to said input text based, at least in part, on said at least one prosody parameter of the text.

2. The method for text to speech conversion according to claim 1, wherein said descriptive prosody annotations of the text further include pronunciation and accent annotation.

3. The method for text to speech conversion according to claim 1, further comprising:

acoustically evaluating the synthesized speech of the text; and adjusting the prosody structure of the text according to the acoustic evaluation result.

4. The method for text to speech conversion according to claim 1, wherein said target speech speed corresponds to a speech speed of a second corpus.

5. The method for text to speech conversion according to claim 1, further comprising:

adjusting the prosody parameter based, at least in part, on the target speech speed.

6. The method for text to speech conversion according to claim 1, wherein adjusting the prosody structure of the text further comprises adjusting the intonation phrase of the text.

7. The method for text to speech conversion according to claim 1, wherein said at least one prosody parameter of the text includes a value for pitch, duration and/or energy associated with the at least one prosody parameter.

8. The method for text to speech conversion according to claim 7, wherein the at least one prosody parameter includes a value for duration of the at least one prosody parameter, and wherein adjusting the at least one prosody parameter comprises adjusting the value for the duration of the at least one prosody parameter based, at least in part, on the target speech speed.

9. The method for text to speech conversion according to claim 1, wherein adjusting said prosody structure of the text comprises adjusting a distribution of prosody phrase length of the text.

10. The method for text to speech conversion according to claim 9, wherein said first corpus has a first distribution of prosody phrase length corresponding to a first threshold for prosody boundary probability under a first speech speed;

wherein adjusting the distribution of the prosody phrase length of the text comprises adjusting the distribution of the prosody phrase length of the first corpus to produce an adjusted first corpus by adjusting the first threshold for prosody boundary probability; and wherein parsing the text comprises parsing the text based, at least in part, on the adjusted first corpus.

11. The method for text to speech conversion according to claim 9, wherein adjusting the prosody phrase length distribution of the text comprises adjusting the distribution of prosody phrase with maximum length or maximum phrase number.

12. The method for text to speech conversion according to claim 1, wherein said prosody structure includes information associated with prosody phrase, and wherein adjusting the prosody structure of the text comprises adjusting a distribution of prosody phrase length of the text to a target distribution.

13. The method for text to speech conversion according to claim 4, wherein said first corpus has a first distribution for prosody phrase length corresponding to a first threshold for prosody boundary probability under a first speech speed, said second corpus has a second distribution for prosody phrase length corresponding to a second threshold for prosody boundary probability under said second speech speed, and wherein adjusting the prosody structure of the text comprises:

generating an adjusted first corpus by adjusting the first threshold for prosody boundary probability according to the target speech speed, such that the distribution for prosody phrase length of the first corpus matches the distribution for prosody phrase length of the second corpus; and wherein parsing the text comprises parsing the text based, at least in part, on the adjusted first corpus.

14. The method for text to speech conversion according to claim 12, wherein adjusting the prosody phrase length distribution of the text comprises adjusting the prosody phrase length distribution of the text using a curve fitting method.

15. An apparatus for text to speech conversion, comprising:

text analysis means for parsing input text to obtain descriptive prosody annotations of the text based on a text-to-speech model generated from a first corpus, wherein said descriptive prosody annotations of the text include a prosody structure of the text, wherein the prosody structure of the text is associated with an initial speech speed, and wherein said prosody structure includes information selected from the group consisting of prosody word information, prosody phrase information, and intonation phrase information;

prosody parameter prediction means for predicting at least one prosody parameter of the text based, at least in part, on the parsed text;

speech synthesis means for synthesizing speech corresponding to said input text based, at least in part, on said at least one prosody parameter of the text; and prosody structure adjusting means for adjusting the prosody structure of the text based, at least in part, on a target speech speed for the synthesized speech, wherein the target speech speed is different than the initial speech speed.

16. The apparatus for text to speech conversion according to claim 15, wherein said prosody structure adjusting means is further configured to adjust the intonation phrase of the text according to the target speech speed.

17. The apparatus for text to speech conversion according to claim 15, wherein said prosody structure adjusting means is further configured to adjust a distribution of prosody phrase length of the text according to the target speech speed.

18. The apparatus for text to speech conversion according to claim 15, wherein said at least one prosody parameter of the text includes a value for pitch, duration, and/or energy associated with the at least one prosody parameter.

19. The apparatus for text to speech conversion according to claim 17, wherein said first corpus has a first distribution of prosody phrase length corresponding to a first threshold for prosody boundary probability under a first speech speed, wherein said prosody structure adjusting means is further configured to generate an adjusted first corpus by adjusting the distribution of the prosody phrase length of the first corpus by adjusting the first threshold for prosody boundary probability; and wherein said text analysis means is further configured to parse the text according to the adjusted first corpus.

20. The apparatus for text to speech conversion according to claim 17, wherein said prosody structure adjusting means is further configured to adjust the prosody phrase length distribution of the text by adjusting the distribution of prosody phrase with maximum length or maximum phrase number.

21. The apparatus for text to speech conversion according to claim 15, wherein said target speech speed corresponds to a speech speed of a second corpus.

22. The apparatus for text to speech conversion according to claim 21, wherein said first corpus has a first distribution for prosody phrase length corresponding to a first threshold for prosody boundary probability under a first speech speed, said second corpus has a second distribution for prosody phrase length corresponding to a second threshold for prosody boundary probability under said second speech speed, and wherein said prosody structure adjusting means is further configured to generate an adjusted first corpus by adjusting the first threshold for prosody boundary probability according to the target speech speed, such that the distribution for prosody phrase length of the first corpus matches that of the second corpus; and wherein said text analysis means is further configured to parse the text according to the adjusted first corpus.

23. The apparatus for text to speech conversion according to claim 15, wherein said prosody structure includes information associated with prosody phrase, and wherein said prosody structure adjusting means is further configured to adjust a distribution of prosody phrase length of the text to a target distribution.

24. The apparatus for text to speech conversion according to claim 23, wherein said speech synthesis means is further configured to adjust the prosody phrase length distribution of the text using a curve fitting method.

25. The apparatus for text to speech conversion according to claim 15, wherein said speech synthesis means is further configured to adjust the at least one prosody parameter according to the target speech speed.

26. The apparatus for text to speech conversion according to claim 25, wherein the at least one prosody parameter includes a value for duration of the at least one prosody parameter, and wherein said speech synthesis means is further configured to adjust the value of the duration of the at least one prosody parameter based, at least in part, on the target speech speed.

27. A method for adjusting a first corpus used for text-to-speech conversion, said method comprising:

building a decision tree for prosody structure prediction based on the first corpus, wherein the first corpus is associated with an initial speech speed;

setting a target speech speed for an adjusted corpus, wherein the target speech speed is different than the initial speech speed;

building a relationship between a distribution for prosody phrase length and the initial speech speed based, at least in part, on said decision tree; and generating, with at least one processor, the adjusted corpus by adjusting said distribution for prosody phrase length of the first corpus according to the target speech speed based, at least in part, on said decision tree and said relationship.

28. The method for adjusting a first corpus according to claim 27, wherein building the decision tree further comprises:

extracting prosody boundary context information for at least one word in the first corpus; and building said decision tree for prosody boundary prediction based, at least in part, on the prosody boundary context information.

29. An apparatus for adjusting a first corpus used for text-to-speech conversion, said apparatus comprising:

means for building a decision tree for prosody structure prediction based on the first corpus, wherein the first corpus is associated with an initial speech speed;

means for setting a target speech speed for an adjusted corpus, wherein the target speech speed is different than the initial speech speed;

means for building a relationship between a distribution for prosody phrase length and the initial speech speed based, at least in part, on said decision tree; and means for generating the adjusted corpus by adjusting said distribution of prosody phrase length of the first corpus based, at least in part, on the target speech speed based on said decision tree and said relationship.

30. The apparatus for adjusting a text to speech corpus according to claim 29, wherein the means for building the decision tree is further configured to:

extract prosody boundary context information for at least one word in the first corpus; and build said decision tree for prosody boundary prediction based, at least in part, on the prosody boundary context information.

31. A non-transitory computer-readable medium encoded with a plurality of instructions that, when executed by a computer, perform a method, the method comprising:

parsing input text to obtain descriptive prosody annotations of the text based, at least in part, on a text-to-speech model generated from a first corpus, wherein the descriptive prosody annotations include a prosody structure of the text, wherein the first corpus is associated with an initial speech speed;

adjusting the prosody structure of the text based, at least in part, on a target speech speed, wherein the target speech speed is different than the initial speech speed, and wherein said prosody structure includes information selected from the group consisting of prosody word information, prosody phrase information, and intonation phrase information;

determining at least one prosody parameter of the text based, at least in part, on the adjusted prosody structure of the text; and synthesizing speech corresponding to said input text based, at least in part, on said at least one prosody parameter of the text.

32. A non-transitory computer readable medium encoded with a plurality of instructions that, when executed by a computer, perform a method for adjusting a first corpus used for text-to-speech conversion, said method comprising:

building a decision tree for prosody structure prediction based on the first corpus, wherein the first corpus is associated with an initial speech speed;

setting a target speech speed for an adjusted corpus, wherein the target speech speed is different than the initial speech speed;

building a relationship between a distribution for prosody phrase length and the initial speech speed based, at least in part, on said decision tree; and generating the adjusted corpus by adjusting said distribution for prosody phrase length of the first corpus according to the target speech speed based, at least in part, on said decision tree and said relationship.

33. An apparatus for text to speech conversion, comprising:

at least one processor programmed to:

parse input text to obtain descriptive prosody annotations of the text based on a text-to-speech model generated from a first corpus, wherein said descriptive prosody annotations of the text include a prosody structure of the text, wherein the first corpus is associated with an initial speech speed, and wherein said prosody structure includes information selected from the group consisting of prosody word information, prosody phrase information, and intonation phrase information;

determine at least one prosody parameter of the text based, at least in part, on the parsed input text;

synthesize speech corresponding to said input text based, at least in part, on said at least one prosody parameter of the text; and adjust the prosody structure of the text based, at least in part, on a target speech speed for the synthesized speech, wherein the target speech speed is different than the initial speech speed.

34. An apparatus for adjusting a first corpus used for text-to-speech conversion, said apparatus comprising:

at least one processor programmed to:

build a decision tree for prosody structure prediction based on the first corpus, wherein the first corpus is associated with an initial speech speed;

set a target speech speed for an adjusted corpus, wherein the target speech speed is different than the initial speech speed;

build a relationship between a distribution for prosody phrase length and the initial speech speed based, at least in part, on said decision tree; and generate the adjusted corpus by adjusting said distribution of prosody phrase length of the first corpus based, at least in part, on the target speech speed based on said decision tree and said relationship.

* * * * *